United States Patent Office 3,362,879
Patented Jan. 9, 1968

3,362,879
TYROSINE TRANQUILIZING COMPOSITIONS
AND METHODS OF TREATMENT
Sidney Udenfriend and Albert Sjoerdsma, Bethesda, and Sydney Spector, Silver Spring, Md., assignors to the United States of America as represented by the Secretary of the Department of Health, Education, and Welfare
No Drawing. Filed June 5, 1967, Ser. No. 644,455
12 Claims. (Cl. 167—65)

This application is a continuation-in-part of Ser. No. 424,808, filed Jan. 11, 1965, and now abandoned.

This invention relates to pharmaceutical compositions. In particular, the invention relates to pharmaceutical compositions which possess tranquilizing activity and contain as the principal active ingredient certain derivatives of phenylalanines. The invention also relates to a method of tranquilizing human subjects utilizing the above compositions.

In accordance with the present invention, there are provided pharmaceutical compositions which can be utilized for tranquilizing warm-blooded animals such as the human host, and which contain as the active ingredient a phenylalanine derivative of the formula

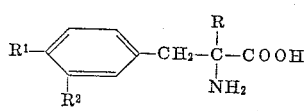

wherein R represents hydrogen or a lower alkyl radical, preferably containing not more than 4 carbon atoms; $R^1$ represents hydrogen or hydroxy and $R^2$ represents hydrogen or halogen, preferably iodine, provided that when $R^2$ is hydrogen and $R^1$ is hydroxy, then R must be alkyl. The above represented compounds may be utilized in the free form or in the form of non-toxic, pharmaceutically acceptable salts and such salts are included within the scope of this invention. Suitable salts are, for example, the pharmaceutically acceptable acid addition salts such as, for example, salts from mineral acids such as hydrochloric acid, hydrobromic acid, sulfuric acid, nitric acid and orthophosphoric acid, or organic acids such as acetic acid, propionic acid, pivalic acid, succinic acid, maleic acid, fumaric acid, lactic acid, malic acid, tartaric acid, citric acid, glutonic acid, L-ascorbic acid, benzoic acid, salicylic acid, methyl sulfonic acid, ethyl disulfonic acid, p-toluene sulfonic acid, naphthalene disulfonic acid and β-hydroxy ethyl sulfonic acid. Furthermore, the compounds may be utilized in their racemic or optically active d or l forms. The latter forms are prefered in those instances where the biological activity is greater in one enantiomorph than the other.

Illustrative of the active ingredients which may be utilized in practicing this invention, there may be mentioned the following:

α-methyl-phenylalanine
α-ethyl-phenylalanine
α-n-propyl-phenylalanine
α-methyl-4-hydroxyphenylalanine
α-ethyl-4-hydroxyphenylalanine
3-iodo-4-hydroxyphenylalanine
3-chloro-4-hydroxyphenylalanine
α-methyl-3-iodo-4-hydroxyphenylalanine Of the above-mentioned compounds to be used as active ingredients, the preferred compounds are α-methyl-3-iodo-4-hydroxyphenylalanine, 3-iodo-4-hydroxyphenylalanine, α-methylphenylalanine and α-methyl-4-hydroxyphenylalanine.

This application is a continuation-in-part of Udenfriend, Ser. No. 424,808, filed Jan. 11, 1965, entitled "Pharmaceutical Compositions and Method of Treatment Therewith."

The published art on the present invention is an article published in 1965 (A. Sjoerdsma, K. Engleman, S. Spector and S. Udenfriend on the "Inhibition of Catecholamine Synthesis in Many with Alpha Methyltyrosine and the Withdrawal of Tyrosine Hydroxylase," The Lancet II pp. 1092–1094 (Nov. 27, 1965).

As a tranquilizer, the recommended dosage of the active ingredients is from about 25 mg. to about 250 mg. of the active ingredient two to four times per day. For convenience of administration and for assurance that the aforementioned dosage requirements are met in routine therapy, the active ingredient is provided in unitary form for administration and, preferably, either in unit dosage form such as tablets, capsule, powders, suspensions and the like, or in a form readily subdivided into unit doses.

In the preparation of solid orally administrable compositions contemplated by the present invention, the active ingredient may be admixed with a non-toxic pharmaceutical carrier and dry filled into capsules, or with the aid of suitable excipients such as binders, lubricants, disintegrating agents, fillers and the like, compressed into tablets, pellets, pills and the like using conventional formulating techniques. Such compositions may also contain preservatives, sequestering agents, flavoring agents and the like in order to enhance stability and provide an elegant and palatable preparation. Similarly, various liquid formulations suitable for either parenteral or oral administration can be readily prepared with the aid of suitable dispersing agents, suspending agents and the like.

If sustained release preparations are desired, i.e., preparations wherein the release of the active constituent is achieved over a period of from 8–12 hours, these may be readily prepared by coating the medicament, medicated seeds or tablets with conventional fatty or waxy materials used for this purpose. In such preparations the unit dosage of medicament may be increased to as high as 500 milligrams, the particular amount being sufficient to provide a daily regimen within the range set forth hereinbelow.

In accordance with the method of tranquilizing warm-blooded animals such as the human host, a dosage regimen of the active ingredient in either its racemic, optically active d or l forms or a non-toxic salt thereof is administered internally, preferably orally, to warm-blooded animals in an amount sufficient to produce the desired tranquilizing effect. Although the daily dosage of the active ingredient will vary depending on the particular ingredient employed, and other factors, a daily dosage of from about 50 mg. to about 100 mg. provides satisfactory results.

The compounds constituting the active ingredients of the present invention may be prepared as described in the literature or in the examples which follow.

The following examples are illustrative of the invention.

EXAMPLE 1 d,l α-methyl-3-iodo-4-hydroxyphenylalanine

A solution of 23.2 g. (0.0914 mole) of iodine and excess potassium iodide (at least 60 g.) in 200 ml. of water is added over 1.0 hour to a stirred solution of 15.0 g. (0.0769 mole) of d,l α-methyl-4-hydroxyphenylalanine in 1.5 l. of 28–30% ammonium hydroxide at 15–30° C. After stirring at room temperature for an additional 5 hours, the reaction mixture is transferred to an open beaker and allowed to stand at 20–30° C. overnight. The next day a small amount of tan solid is removed by filtration and the filtrate concentrated under reduced pressure on the steam bath until the pH of the solution reaches 6.5–8.0 and some white solid precipitates. This is collected to give 12.15 g. (49.3%) of d,l α-methyl-3-iodo-4-hydroxyphenylalanine, M.P. 256–8° dec. A sample is dried and submitted for analysis.

*Analysis.*—Calcd. for $C_{10}H_{12}INO_3$: C, 37.41; H, 3.77; I, 39.52. Found: C, 37.66; H, 3.79; I, 39.44.

EXAMPLE 2

*Capsules*

| Components | Mg./capsule | Mg./capsule |
|---|---|---|
| α-Methyl-4-hydroxyphenylalanine | 50–250 | |
| α-Methyl-3-iodo-4-hydroxyphenylalanine | | 50–250 |
| Magnesium stearate U.S.P. | 1–3 | 1–3 |
| Starch | (¹) | (¹) |

¹ Q.s. for satisfactory capsule fill.

The components are blended and filled into hard gelatin capsules in conventional manner.

EXAMPLE 3

*Tablets*

| Components | Mg./tablet | Mg./tablet |
|---|---|---|
| α-Methyl-4-hydroxyphenylalanine | 50–250 | |
| α-Methyl-phenylalanine | | 50–250 |
| Citric acid, anhydrous | 5 | 5 |
| Calcium disodium editate U.S.P. | 0.2 | 0.2 |
| Ethylcellulose N.F. | 30 | 30 |
| Guar gum | 15 | 15 |
| Cellulose, pure | 12 | 12 |
| Silica powder | 2 | 2 |
| Magnesium stearate U.S.P. | 2.5 | 2.5 |
| Dicalcium phosphate N.F. | (¹) | (¹) |

¹ Sufficient to balance formula when the amount of active ingredient is less than 250 mg.

The active ingredient, citric acid, calcium disodium editate, dicalcium phosphate, and a portion of the ethylcellulose are blended. The mixture is made into granules by incorporating the remaining ethylcellulose dissolved in anhydrous alcohol (8% solution). After drying, the granules are reduced in size by milling and mixed with the other components and compressed into tablets in conventional manner.

EXAMPLE 4

*Injectable suspensions*

| Components | Mg./ml. | Mg./ml. |
|---|---|---|
| α-Methyl-4-hydroxyphenylalanine | 10–25 | |
| 3-iodo-4-hydroxyphenylalanine | | 10–25 |
| Polysorbate 80 | 4 | 4 |
| Sodium chloride U.S.P. | 9 | 9 |
| Benzyl alcohol | 9 | 9 |
| Sodium carboxymethyl cellulose | 5 | 5 |
| Ethylenediamine tetraacetic acid, disodium | 2 | 2 |
| Water-for-injection | Q.s. | Q.s. |

All the components except the active ingredients are dissolved in the appropriate amount of water-for-injection, and the solution sterilized by autoclaving. The active ingredient, as a sterile solid, is added aseptically to the autoclave solution and aseptically blended to give a homogenous suspension. The product is then filled into sterile containers in conventional manner.

EXAMPLE 5

Alpha-methyl-p-tyrosine was administered under a physian's supervision at the National Institute of Health, Bethesda, Md., to more than 40 patients for periods varying from a few days to as long as six months. Sedative effects were observed almost uniformly, a confirmation of earlier findings published in 1965 (A. Sjoerdsma, K. Engleman, S. Spector and S. Udenfriend on the Inhibition of Catechomine Synthesis in Man With Alpha Methyltyrosine and in Inhibition of Tyrosine Hydroxylase, The Lancet II, pp. 1092–1094 (Nov. 27, 1965).

The reuslts in 18 adult patients with essential hypertension who received daily doses of one gram or more orally for up to three weeks will serve to illustrate the sedative effect. Of these 18 patients, all but two had evidence of sedation within the first few days after initiating treatment. Sedation was manifested as drowsiness and prolonged periods of sleep. Usually the effect waned with continued treatment but 12 of the 16 patients who had manifested sedation had clinical evidence of continued effect. Four subjects showed evidence of mild agitation and three had associated tremors; these effects were reversible upon lowering of drug dosage. On abrupt withdrawal of drug, 14 of the 18 patients experienced striking insomnia for from 2 to 3 days.

Withdrawal dosage was generally from 1 to 3 grams per day. In one patient, not among the 18, however, sedative effects during drug administration and their cessation on stopping the drug were observed in a maximum dose level of only 0.3 gram per day.

What is claimed is:

1. A pharmaceutical composition comprising an inert, non-toxic pharmaceutically acceptable carrier and a compound of the formula

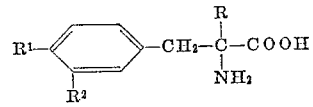

and non-toxic salts thereof, wherein R is selected from the group consisting of hydrogen and lower alkyl, $R^1$ is selected from the group consisting of hydrogen and hydroxy and $R^2$ is selected from the group consisting of hydrogen and halogen, provided that when $R^2$ is hydrogen and $R^1$ is hydroxy, then R must be lower alkyl.

2. The composition of claim 1, wherein the carrier is an orally administrable solid pharmaceutical carrier.

3. The composition of claim 2, wherein the compound is α-methyl-4-hydroxyphenylalanine.

4. The composition of claim 2, wherein the compound is α-methyl-3-iodo-4-hydroxyphenylalanine.

5. The composition of claim 2, wherein the compound is α-methyl-phenylalanine.

6. The composition of claim 2, wherein the compound is 3-iodo-4-hydroxyphenylalanine.

7. A pharmaceutical composition comprising an inert, non-toxic, pharmaceutically acceptable carrier and a compound of the formula

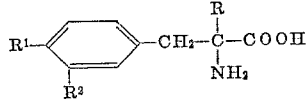

and non-toxic salts thereof, wherein R is selected from the group consisting of hydrogen and lower alkyl, $R^1$ is selected from the group consisting of hydrogen and hydroxy and $R^2$ is selected from the group consisting of hydrogen and halogen, provided that when $R^2$ is hydrogen and $R^1$ is hydroxy, then R must be lower alkyl, said compound being present in an amount of from about 25 mg. to about 500 mg. per unit dose of said composition.

8. The composition of claim 7, wherein the carrier is an orally administrable solid pharmaceutical carrier.

9. A pharmaceutical composition suitable for parenteral administration comprising a compound of the formula

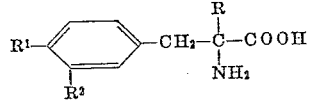

and non-toxic salts thereof, wherein R is selected from the group consisting of hydrogen and lower alkyl, $R^1$ is selected from the group consisting of hydrogen and hydroxy and $R^2$ is selected from the group consisting of hydrogen and halogen, provided that when $R^2$ is hydrogen and $R^1$ is hydroxy then R must be lower alkyl, and a sterile liquid diluent.

10. A method for tranquilizing warm-blooded animals which comprises administering to said animals an effective amount of a compound of the formula

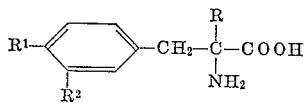

and pharmaceutically acceptable non-toxic salts thereof, wherein R is selected from the group consisting of hydrogen and lower alkyl, $R^1$ is selected from the group consisting of hydrogen and hydroxy and $R^2$ is selected from the group consisting of hydrogen and halogen, provided that when $R^2$ is hydrogen and $R^1$ is hydroxy, then R must be lower alkyl.

11. A method for tranquilizing warm-blooded animals which comprises administering to said animals, per unit dose, between about 25 to about 500 mg. of a compound of the formula

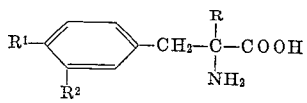

and pharmaceutically acceptable non-toxic salts thereof, wherein R is selected from the group consisting of hydrogen and lower alkyl, $R^1$ is selected from the group consisting of hydrogen and hydroxy and $R^2$ is selected from the group consisting of hydrogen and halogen, provided that when $R^2$ is hydrogen and $R^1$ is hydroxy, then R must be lower alkyl.

12. A method for tranquilizing warm-blooded animals which comprises administering to said animals a daily regimen of from about 50 to about 1,000 mg. of a compound of the formula

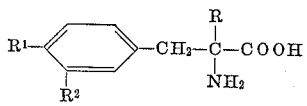

and pharmaceutically acceptable non-toxic salts thereof, wherein R is selected from the group consisting of hydrogen and lower alkyl, $R^1$ is selected from the group consisting of hydrogen and hydroxy and $R^2$ is selected from the group consisting of hydrogen and halogen, provided that when $R^2$ is hydrogen and $R^1$ is hydroxy, then R must be lower alkyl.

References Cited

Jour. of the American Chemical Society, vol. 77, pp. 700–703 (1955).

Chem. Abstracts F, vol. 56, p. 12,792i (1962).

Spector et al. Jour. of Pharm. and Exper. Therapeutics, vol. 117, No. 1, pp. 86–95 (1965).

ALBERT T. MEYERS, *Primary Examiner.*

S. FRIEDMAN, *Assistant Examiner.*